United States Patent Office 3,517,016
Patented June 23, 1970

3,517,016
N-(β-ALKOXY-β-PHENYL-ETHYL)-PIPERIDINE DERIVATIVES
Andrea Pedrazzoli and Leone Dall'Asta, Milan, Italy, assignors to Societe d'Etudes de Recherches et d'Applications Scientifiques & Medicales E.R.A.S.M.E., Paris, France, a French society
No Drawing. Filed Apr. 18, 1967, Ser. No. 631,613
Claims priority, application Great Britain, Apr. 21, 1966, 17,534/66
Int. Cl. C07d 29/24
U.S. Cl. 260—294.3                   2 Claims

ABSTRACT OF THE DISCLOSURE

A novel derivative of 2,2,6,6-tetramethyl-piperidine having the formula:

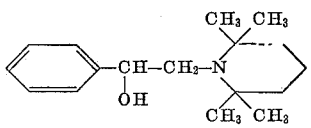

esters thereof and acid addition salts of said derivative and said esters. The compounds of the invention have antihistaminic, parasympathicolytic, sympathicolytic, ganglioplegic, myolitic, local anaesthetic and, in particular, analgesic, antiinflammatory, antipyretic and psychotropically tranquillizing properties.

---

The present invention relates to new therapeutically useful derivatives of 2,2,6,6-tetramethylpiperidine and to a process for their preparation.

The new derivatives of the invention have the following general formula:

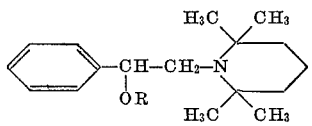

in which R is a hydrogen atom or an acyl group $R^1CO$—, where $R^1$ is:
(a) a straight or branched alkyl or alkenyl radical containing not more than 8 carbon atoms,
(b) a lower alkylthioalkyl, monocyclic aryl, monocyclic aryl lower alkyl, monocyclic aryl lower alkenyl, lower alkoxy monocyclic aryl or lower alkylthio monocyclic aryl radical, which radicals may be unsubstituted or substituted on the aryl nucleus and which have not more than 4 carbon atoms in the lower alkyl or alkenyl portion,
(c) a six-membered heterocyclic radical containing 1 or 2 hetero atoms at least one of which is nitrogen, or
(d)

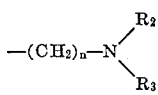

wherein $n$ is 1, 2 or 3 and $R^2$ and $R^3$ are the same or different and each represents a hydrogen atom or a straight or branched lower alkyl or lower alkenyl radical having not more than 4 carbon atoms or $R^2$ and $R^3$ together with the nitrogen atom to which they are attached represent a five or six-membered heterocyclic ring which can contain several hetero atoms, for example pyrrolidine, piperidine, piperazine or morpholine.

The invention also concerns the therapeutically useful salts of these derivatives with inorganic or organic acids. These compounds can be used either in the racemic form or in the form of the two optically active isomers, that is to say in the dextrorotatory form and in the laevorotatory form.

The process of preparation of the new derivatives of the invention can be represented by the following reaction scheme:

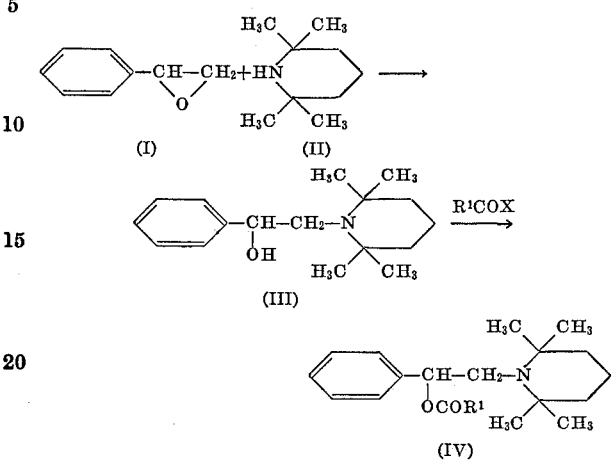

wherein X is a halogen atom and $R^1$ has the meaning defined above.

The compounds of the invention can be prepared by reacting styrene oxide (I) with 2,2,6,6-tetramethylpiperidine (I)) with heating for several hours and in the presence of a catalytic quantity of a mineral acid, preferably hydrochloric, sulphuric or phosphoric acid. The product obtained (III), namely 1-(beta-hydroxy-phenethyl)-2,2,6,6-tetramethyl-piperidine can be utilised as such, that is to say in the racemic form in order to form the corresponding racemic esters (IV) or it can be separated into the two optical isomers in order to obtain the corresponding esters (IV) in the laevorotatory or dextrorotatory forms.

The product III when dissolved in an inert organic solvent, such as benzene, toluene, xylene, tetrahydrofuran or dimethylformamide, can be esterified by reaction with an acid halide of the formula $R^1$—COX, preferably an acid chloride, if required in the presence of a basic hydrogen acceptor, such as a tertiary amine, e.g., triethylamine, pyridine or dimethylaniline, in order to give the corresponding ester IV.

The reaction proceeds at the ambient temperature, but is preferably completed by heating the mixture under reflux for several hours.

In the case of derivatives where $R^1$ is a lower thioalkyl radical or a monocyclic aryl lower thioalkyl radical, which may be substituted on the aromatic ring, the product III, 1-(beta-hydroxy-phenethyl) - 2,2,6,6-tetramethyl-pipeidine, is reacted with a halo-alkylcarboxylic acid chloride, X—$(CH_2)_n$—COCl (where X=halogen and $n=1,2$, or 3), the 1-[beta-(chloracetoxy)-phenethyl]-2,2,6,6-tetramethyl-piperidine is separated in the form of its hydrochloride and this compound is reacted with an alkyl-mercaptan or a thiophenol, which may be unsubstituted or substituted on the aromatic ring, of the formula $R^4SH$, wherein $R^4$ is an alkyl radical having not more than 8 carbon atoms or a phenyl radical, which may be substituted, in the presence of an alkaline proton acceptor.

The reaction scheme is as follows:

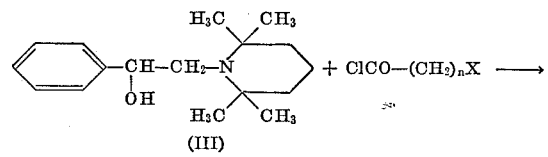

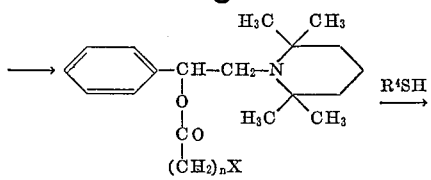

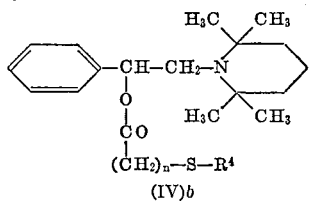

In the case where R¹ is

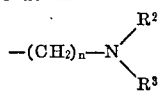

the product III, 1-(beta-hydroxy-phenethyl)-2,2,6,6-tetramethyl piperidine, is first reacted with a halo-alkyl-carboxylic halide, X—(CH₂)ₙ—COCl (where X=halogen, n=1, 2 or 3), and the halogen derivative so obtained is then reacted (without being isolated) with the desired amine. The reaction scheme is as follows:

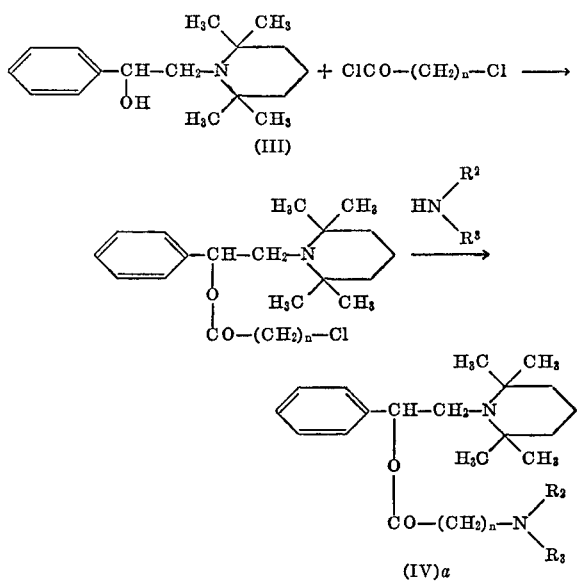

At the end of the esterification reaction, the product obtained (IV)a, either in the racemic form or in the dextrorotatory or laevorotatory form, can be separated from the reaction mixture as the free base. The latter can be converted into salts with inorganic or organic acids which are pharmaceutically useful, such as the hydrochloride, sulphate, phosphate, citrate or succinate.

The derivatives of the invention are stable to light and to heat, they have a low toxicity and a remarkable pharmacological activity, as they have antihistaminic parasympathicolytic, sympathicolytic, ganglioplegic, myolitic, local anaesthetic and, in particular, analgesic, anti-inflammatory, antipyretic and psychotropically transquillising properties.

The following examples are given in order to illustrate the invention but without limiting it to such examples.

EXAMPLE 1

1-(beta-hydroxy-phenethyl)-2,2,6,6-tetramethyl piperidine hydrochloride

A mixture of 42 g. of 2,2,6,6-tetramethyl-piperidine, 72 g. of styrene oxide and 2 ml. of concentrated hydrochloric acid is heated to 160° C. for 8 hours. After cooling, the reaction mixture is maintained under vacuum at 160° C. of 2 hours and the residue is then treated with a solution of HCl in isopropanol until a clearly acid reaction is obtained. The solid product obtained is filtered and crystallised from isopropanol. Racemic 1-(beta-hydroxy - phenethyl) - 2,2,6,6 - tetramethyl - piperidine hydrochloride is obtained, which melts at 221°–223° C.

EXAMPLE 2

1-(beta-propionoxy-phenethyl)-2,2,6,6-tetramethyl piperidine hydrochloride 9.25 g of propionyl chloride is added to a solution of 26.1 g. of 1-beta-hydroxy-phenethyl)-2,2,6,6-tetramethyl piperidine in 150 ml. of anhydrous xylene and then 10 g. of triethylamine dissolved in 25 ml. of anhydrous xylene are added. The mixture is heated at 80° C. for 3 hours. It is then cooled and filtered and the xylene solution is washed with water and then dried and concentrated under vacuum. The oily residue is dissolved in 100 ml. of ethyl ether and HCl is introduced into the solution so obtained until there is an acid reaction. The crude product is filtered and crystallised from tetrahydrofuran and 13.2 g. of the pure product are obtained melting at 179°–180.5° C.

EXAMPLE 3

1-(beta-cinnamoyloxy-phenethyl)-2,2,6,6-tetramethyl-piperidine hydrochloride 7 g. of triethylamine dissolved in 25 ml. of anhydrous benzene is added to a solution of 12 g. of cinnamoyl chloride and 18.3 g. of 1-(beta-hydroxy-phenethyl)-2,2,6,6-tetramethyl-piperidine in 200 ml. of anhydrous benzene and the mixture is heated under reflux for 3 hours. It is then cooled and the suspension is treated with water, the benzene phase is dried and then concentrated under vacuum in order to obtain an oil. The oil is taken up in 200 ml. anhydrous ethyl ether and gaseous HCl is introduced into the cooled solution until there is an acid reaction. The solid obtained is separated by filtration and crystallised from a mixture of 95% ethanol and isopropyl ether. 20.5 g. of pure product is obtained, melting at 218°–219° C.

EXAMPLE 4

1-[beta-(p-chloro-benzoyl-oxy)-phenethyl]-2,2,6,6-tetramethyl-piperidine hydrochloride 10 g. of triethylamine dissolved in 25 ml. of anhydrous benzene is added to a solution of 17.5 g. of p-chlorobenzoyl chloride and 26.1 g. of 1-(beta-hydroxy-phenethyl) - 2,2,6,6-tetramethyl - piperidine in 200 ml. of anhydrous benzene and the mixture is heated under reflux for 2 hours. It is then cooled, filtered and the benzene solution is thoroughly washed with water and then dried and treated with a saturated ethereal solution of HCl until there is an acid reaction. The solid product obtained is crystallised from a mixture of 95% ethanol and isopropanol. 26 g. of pure product is obtained melting at 227°–228.5° C.

EXAMPLE 5

1-[beta-(2'-acetoxy-3'-methyl-benzoyl-oxy)-phenethyl]-2,2,6,6-tetramethyl-piperidine hydrochloride 26.1 g. of 1-(beta-hydroxy-phenethyl) - 2,2,6,6-tetramethyl-piperidine dissolved in 200 ml. of anhydrous toluene is added to a solution of 21.3 g. of 2-acetoxy-3-methylbenzoyl chloride in 200 ml. of anhydrous toluene. The mixture is heated to 100° C. for 2 hours and then cooled and filtered. The crude solid is recrystallised from 95% ethanol and 26.3 g. of pure product is obtained melting at 199°–201° C.

EXAMPLE 6

1-(beta-nicotinoyl-oxy-phenethyl)-2,2,6,6-tetramethyl-piperidine dihydrochloride 20 g. of triethylamine is added to a mixture of 17.8 g. of nicotinoyl chloride in the form of hydrochloride, 26.1 g. of 1 - (beta-hydroxy-phenethyl) - 2,2,6,6-tetramethyl-piperidine and 150 ml. of anhydrous benzene and the mixture is heated under reflux for 3 hours. After cooling, filtration, washing and drying of the benzene solution, it is concentrated under vacuum and then the residue is dissolved in 100 ml. of anhydrous ethyl ether. Gaseous HCl is introduced into the solution so obtained until there is an acid reaction and the crude product is filtered off and crystallised from a mixture of 95% ethanol and acetone. 28 g. of pure product is obtained melting at 142°–145° C.

EXAMPLE 7 d-1-(beta-phenoxy-acetoxy-phenethyl)-2,2,6,6-tetramethylpiperidine hydrochloride 6 g. of triethylamine dissolved in 40 ml. of anhydrous benzene is added to 10 g. of phenoxyacetyl chloride and 15.7 g. of d-1-(beta - hydroxy - phenethyl) - 2,2,6,6-tetramethyl-piperidine (separated by treating the racemic mixture with d-10-camphosulphonic acid) in 100 ml. of anhydrous benzene. The mixture is heated under reflux for 1 hour and then cooled and treated with water. The dried benzene phase is concentrated under vacuum until an oil is produced, which is taken up in 120 ml. of anhydrous ethyl ether. HCl in solution in isopropanol is added to the solution so obtained. 21 g. of crude product is obtained. After crystallisation from isopropanol 16 g. of pure product is obtained melting at 203°–204.5° C.; $[\alpha]_D^{20}=+10.2°$ (c.=2/$H_2O$).

By the same method l-1-(beta-phenoxyacetoxy-phenethyl)-2,2,6,6-tetramethyl-piperidine is obtained; M.P.=203°–204.5° C.; $[\alpha]_D^{20}=-10.7°$ (c.=2/$H_2O$).

EXAMPLE 8

1-[β-(chloracetoxy)-phenethyl]-2,2,6,6-tetramethyl-piperidine hydrochloride

A solution of 65 g. of 1-(beta-hydroxy-phenethyl)-2,2,6,6-tetramethyl-piperidine in 350 ml. of anhydrous benzene is slowly added to a solution of 28.25 g. of chloroacetyl chloride in 250 ml. of anhydrous benzene. Then 22.5 g. of triethylamine dissolved in 100 ml. of anhydrous benzene is added and the mixture is agitated for 2 hours at the ambient temperature and is then heated to 50° C. for 3 hours. It is then cooled and filtered and the benzene solution is washed with water. After drying, it is concentrated under vacuum and the residue is dissolved in isopropanol and gaseous HCl is passed into the solution obtained. 7.5 g. of 1-[beta-(chloracetoxy)-phenethyl]-2,2,6,6-tetramethyl-piperidine is obtained in the form of the hydrochloride. M.P.=196°–198° C.

EXAMPLE 9

1-[beta-(p-chlorophenyl-thioacetoxy)-phenethyl]-2,2,6,6-tetramethyl-piperidine hydrochloride A solution of 4.1 g. of NaOH in 30 ml. of water is slowly added to a solution of 18.7 g. of 1-[beta-(chloroacetoxy)-phenethyl]-2,2,6,6-tetramethyl-piperidine, 7.5 g. of p-chloro-thiophenol and 100 ml. of ethanol, the temperature being maintained at 20°–25° C.

The mixture is agitated for 1½ hours at the ambient temperature and then the ethanol is distilled off under reduced pressure. The residue is extracted with benzene and the united benzene extracts are concentrated. The oily residue is dissolved in isopropanol and acidified with gaseous HCl.

19 g. of 1-[beta-(p-chlorophenyl-thioacetoxy)-phenethyl]-2,2,6,6-tetramethyl-piperidine is obtained in the form of the hydrochloride, having a melting point of 198°–199° C. After crystallisation from isopropanol, the product has a melting point of 199°–200° C.

Typical compounds according to the invention are set out in the following table by way of illustrative example.

General formula

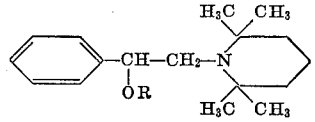

| Compound | R | Formula of product | M.P.,°C. |
|---|---|---|---|
| 1 | H | $C_{17}H_{27}NO.HCl$ | 221–223 |
| 2 | —CO—$CH_2CH_3$ | $C_{20}H_{31}NO_2.HCl$ | 179–180.5 |
| 3 | ⌬—CH—CO—<br>　　│<br>　　$CH_2CH_3$ | $C_{27}H_{37}NO_2.HCl$ | 175–178 |
| 4 | ⌬—CH=CH—CO— | $C_{26}H_{33}NO_2.HCl$ | 218–219 |
| 5 | $C_6H_5$＼<br>　　　CH—CO—<br>$C_6H_5$／ | $C_{31}H_{37}NO_2.HCl$ | 202–203.5 |
| 6 | Cl<br>│<br>⌬—CO— | $C_{24}H_{30}ClNO_2.HCl$ | 198–200 |
| 7 | Cl—⌬—CO— | $C_{24}H_{30}ClNO_2.HCl$ | 227–228.5 |
| 8 | F—⌬—CO— | $C_{24}H_{30}FNO_2.HCl$ | 219–220 |
| 9 | ⌬—CO—<br>│<br>$F_3C$ | $C_{25}H_{30}F_3NO_2.HCl$ | 207–209 |
| 10 | 　　　　Cl<br>　　　　│<br>Cl—⌬—CO— | $C_{24}H_{29}Cl_2NO_2.HCl$ | 225–227 |

| Compound | R | Formula of product | M.P.,°C. |
|---|---|---|---|
| 11 | O₂N–C₆H₄–CO– | C₂₄H₃₀N₂O₄ | 130–131.5 |
| 12 | H₃CO–C₆H₄–CO– | C₂₅H₃₃NO₃·HCl | 192,5–194 |
| 13 | (H₃CO)₃C₆H₂–CO– | C₂₇H₃₇NO₅·HCl | 228–229.5 |
| 14 | (OCOCH₃)C₆H₄–CO– | C₂₆H₃₃NO₄·HCl | 202,5–203.5 |
| 15 | (H₃C)(OCOCH₃)C₆H₃–CO– | C₂₇H₃₅NO₄·HCl | 199–201 |
| 16 | (OCOCH₃)(Cl)C₆H₃–CO– | C₂₆H₃₂ClNO₄·HCl | 199,5–201 |
| 17 | pyridyl–CO– | C₁₉H₂₂N₂O₂·2HCl | 142–145 |
| 18 | C₆H₅–O–CH₂–CO– | C₂₅H₃₃NO₃·HCl | 206–207 |
| 19(d) | C₆H₅–O–CH₂–CO– | C₂₅H₃₃NO₃·HCl | 203–204.5 [α]D²⁰=+10,2° (c=2/H₂O) |
| 20(l) | C₆H₅–O–CH₂–CO– | C₂₅H₃₃NO₃·HCl | 203–204.5 [α]D²⁰=–10,7° (c=2/H₂O) |
| 21 | (Cl)C₆H₄–O–CH₂–CO– | C₂₅H₃₂ClNO₃·HCl | 218–220 |
| 22 | (Cl)C₆H₄–O–CH₂–CO– | C₂₅H₃₂ClNO₃·HCl | 202–203.5 |
| 23 | Cl–C₆H₄–O–CH₂–CO– | C₂₅H₃₂ClNO₃·HCl | 222–224.5 |
| 24 | Cl–(Cl)C₆H₃–O–CH₂–CO– | C₂₅H₃₁Cl₂NO₃·HCl | 204–206 |
| 25 | (CH₃)C₆H₄–O–CH₂–CO– | C₂₆H₃₅NO₃·HCl | 197,5–199.5 |
| 26 | (OCH₃)C₆H₄–O–CH₂–CO– | C₂₆H₃₇NO₄·HCl | 196–197 |
| 27 | (CH₃)₂C₆H₃–O–CH₂–CO– | C₂₇H₃₇NO₃·HCl | 199–202 |
| 28 | C₆H₅–S–CH₂–CO– | C₂₅H₃₃NO₂S·HCl | 198–199 |
| 29 | Cl–C₆H₄–S–CH₂–CO– | C₂₅H₃₂ClNO₂S·HCl | 199–200 |
| 30 | (H₅C₂)₂N–CH₂–CO– | C₂₃H₃₈N₂O₂·2HCl | 219–221 |

The compounds of the invention have a notable pharmaceutical activity. They are hardly toxic and cause no undesirable secondary reactions. For instance, the derivative of the formula:

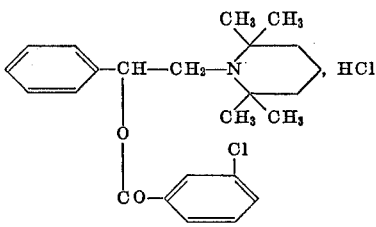

has a lethal dose $LD_{50}$, by oral administration, in white mice of 3200 mg./kg.

The analgesic activity of this derivative has been tested by various methods:

By utilizing pain electrosinulation on the tail of mice according to the test described by Paalzov, L., Svensk farmaceutisk Tidskrift, 1962, 66, 860 (slightly modified), an effective dose $ED_{50}$ of 25 mg./kg. was found;

By utilizing the phenyl-p-quinone test described by Siegmund, E., in Proc. Soc. Exp. Biol. Med., 1957, 95, 729, and by Hendershot, Forsaith, in J. Pharmacol. Exptl. Therap., 1959, 129, 237, an $ED_{50}$ of 100 mg./kg. by oral administration was found;

By utilizing the hot plate method (Eddy and Leimbach, J. Pharmacol, Exptl. Therap., 1953, 107, 385), it is found that the dose which doubles the resistance time is 120 mg./kg. by oral administration.

The tranquillizing sedative activity of the same derivative has been tested by the following methods:

By utilizing the rotating rod test (Proc. Soc. Exptl. Biol. Med., 1958, 99, 44), an $ED_{50}$ of 100 mg./kg. is found by oral administration;

By utilizing the test of inhibition of the motive excitation caused by amphetamine (according to Dunham and Miya, J. Amer. Pharm. Ass., 1957, 46, 208), an effective dose $ED_{50}$ of 12 mg./kg. is found;

By utilizing the test of inhibition of aggressiveness in mice (Yen, Arch. int. Pharmacodyn., 1959, 123, 179), a dose of 7.5 mg./kg. by intraperitoneal administration is found.

The compounds according to the invention also have antiinflammatory and anticonvulsant properties.

What is claimed is:

1. A compound selected from the group consisting of (1) a compound of the formula:

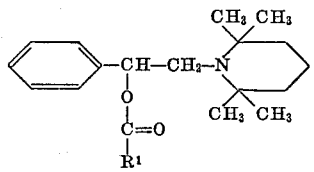

in which $R^1$ is a member selected from the group consisting of phenyl; phenoxymethyl and such phenyl and phenoxymethyl-substituted in the ring by at least one member selected from the group consisting of halo, trifluoromethyl, nitro, lower alkyl, lower alkoxy and lower alkanoyloxy; and (2) a therapeutically useful salt thereof with an acid.

2. The compound as claimed in claim 1 which is a hydrochloride and $R_1$ is a group of the formula:

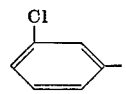

References Cited

UNITED STATES PATENTS 3,153,613  10/1964  Jones et al. _____ 260—293 XR

OTHER REFERENCES

Blicke et al.: J. Am. Chem. Soc., vol. 52, pp. 235 to 240 (1930).

Mailey et al.: J. Org. Chem., vol. 22, pp. 1061 to 1065 (1957).

Wheatley et al.: J. Org. Chem., vol. 23, pp. 1360 to 1363 (1958).

Haring: Helv. Chim. Acta, vol. 42, pp. 1916 to 1921 (1959).

JOHN D. RANDOLPH, Primary Examiner

U.S. Cl. X.R.

260—240, 247.5, 268, 293, 294.7, 699